US009625887B2

(12) United States Patent
Ilic et al.

(10) Patent No.: US 9,625,887 B2
(45) Date of Patent: Apr. 18, 2017

(54) CONTINGENCY SCREENING IN MULTI-CONTROL AREA ELECTRICAL POWER SYSTEMS USING COORDINATED DC POWER FLOW

(71) Applicant: Carnegie Mellon University, Pittsburgh, PA (US)

(72) Inventors: Marija Ilic, Pittsburgh, PA (US); Sanja Cvijic, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 686 days.

(21) Appl. No.: 13/958,248

(22) Filed: Aug. 2, 2013

(65) Prior Publication Data

US 2014/0039702 A1    Feb. 6, 2014

Related U.S. Application Data

(60) Provisional application No. 61/742,156, filed on Aug. 3, 2012.

(51) Int. Cl.
| | | |
|---|---|---|
| *G05D 3/12* | (2006.01) | |
| *G05B 15/02* | (2006.01) | |
| *H02J 3/06* | (2006.01) | |
| *H02J 3/00* | (2006.01) | |

(52) U.S. Cl.
CPC .............. *G05B 15/02* (2013.01); *H02J 3/06* (2013.01); *H02J 2003/001* (2013.01); *H02J 2003/007* (2013.01); *Y02E 60/76* (2013.01); *Y04S 40/22* (2013.01)

(58) Field of Classification Search
CPC ......... G06F 2203/04806; G06F 3/0481; G06F 17/30873; G06F 17/30241; G06F 2203/04803; G06F 2203/04805; G06F 3/04842; G09G 2340/0407; G09G 5/14
See application file for complete search history.

(56) References Cited

U.S. PATENT DOCUMENTS

| | | | | |
|---|---|---|---|---|
| 8,060,259 | B2 * | 11/2011 | Budhraja | H02J 3/008 700/291 |
| 8,321,804 | B2 * | 11/2012 | Castelli | G06Q 10/063 715/758 |
| 2004/0236620 | A1 * | 11/2004 | Chauhan | G06Q 10/06 705/7.14 |
| 2009/0030556 | A1 * | 1/2009 | Castelli | G06Q 10/063 700/286 |
| 2009/0287739 | A1 * | 11/2009 | Zhang | G06Q 10/109 |
| 2013/0282189 | A1 * | 10/2013 | Stoupis | H02J 3/00 700/286 |
| 2015/0153716 | A1 * | 6/2015 | Anderson | G01D 4/004 700/286 |

FOREIGN PATENT DOCUMENTS

CA    EP 1983302 A1 *  10/2008  ........... G01C 21/367

* cited by examiner

*Primary Examiner* — Darrin Dunn
(74) *Attorney, Agent, or Firm* — Downs Rachlin Martin PLLC

(57) ABSTRACT

A new approach in contingency analysis is presented based on a modular method for power flow calculation. The proposed method exploits reuse of power flow data for modules not affected by an outage. The method minimizes the number of necessary computations and matrix inversions in contingency analysis; this is achieved by recalculating only the modules affected by the change and reusing data from the original system for all other modules.

14 Claims, 10 Drawing Sheets

CONTINGENCY SCREENING IN MULTI-CONTROL AREA ELECTRICAL POWER SYSTEMS USING COORDINATED DC POWER FLOW

RELATED APPLICATION DATA

This application claims the benefit of priority of U.S. Provisional Patent Application Ser. No. 61/742,156, filed on Aug. 3, 2012, and titled "Contingency Screening in a Multi-Control Area System Using Coordinated DC Power Flow," which is incorporated by reference herein in its entirety.

FIELD OF THE INVENTION

The present invention generally relates to the field of electrical power networks. In particular, the present invention is directed to contingency screening in multi-control area electrical power systems using coordinated "DC" power flow.

BACKGROUND

Electrical power systems represent one of the most important infrastructures of the modern world; as a result, security plays a significant role in their design and maintenance. Cascading blackouts occasionally remind us of the tremendous importance that security has in power systems. The role of security is to decrease the risk of possible future blackouts and ensure reliable operation at all times. A power system is a highly complex and unpredictable entity composed of equipment prone to failures. "Security" refers to the system's ability to meet predicted load even in the case of a component failure. The term "contingency" is used to refer to system operation in the event of an unplanned outage. The most common cause of outages is line tripping. Reliability criteria is a well-defined standard that specifies what a power system has to withstand in order to be considered secure. The reliability criteria most-commonly used in practice is the N−1 reliability criteria that requires the system to maintain substantially normal operating conditions in the event of outage of any one (hence "N−1") component in the system. When the reliability criteria is met, the system is considered secure.

Obviously, the total number of contingencies in large-scale power system networks is very high. Contingency analysis (CA) tests each contingency individually for possible security violations. Preferably, an alternating-current (AC) power flow should be calculated for each contingency separately, but this process would take too long. This is why most CA algorithms use simplified formulations of AC power flow: decoupled AC and linearized real power-phase angle power flow (historically referred to as a direct-current ("DC") power flow, though in a sense this could be considered a bit of a misnomer since the DC power flows define linearized relationships between real power flow injections and nodal phase angles in an electrical system such as an AC power grid; the term is used because the equations involved do not have sinusoidal terms after linearization is done). Additionally, the CA process is usually divided into two stages: contingency selection and contingency evaluation. Contingency selection tests each contingency in order to determine the most critical ones. Once they have been selected, it is possible to execute full AC power flow on a small subset of all contingencies, such as the most critical ones, to check for system violations. Contingency evaluation refers to identifying which preventive actions need to be performed in order to eliminate contingency violations.

Along with recent developments in technology resulting in increased computing power, there has been a corresponding increase of interest in integrating additional security features into existing algorithms such as Unit Commitment (UC) and Economic Dispatch (ED). This is how Security Constrained Unit Commitment (SCUC) and Security Constrained Economic Dispatch (SCED) have been developed. SCUC determines unit commitment sequence with dispatching for the next 24 hours while ensuring secure system operation for steady state conditions and for all contingencies. Testing all contingencies every hour significantly increases the overall complexity of the algorithm. Although available computational power is considered large, it still represents a limiting factor for SCUC/SCED algorithms executed on large-scale systems. Therefore, these algorithms require more intelligent contingency handling. Various approaches to improving the efficiency of CA have been proposed. A major issue in CA is that, despite the fact that a system experiencing an outage is very similar to the system prior to the outage, power flow has to be executed "from scratch" for every contingency, and power flow calculation for every contingency in a large system is extremely computationally demanding.

SUMMARY OF THE DISCLOSURE

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted).

In one implementation, the present disclosure is directed to a method of performing a contingency analysis of an electrical power network. The method includes generating a mesh model of the electrical power network; partitioning the mesh model into a plurality of areas, transforming the plurality of areas into corresponding respective tree structures, wherein, during the transformation, each of the plurality of areas is disconnected from the mesh model, connecting the tree structures with tie-lines to create a joined reference frame, and performing a multi-area transformation on the joined reference frame.

In another implementation, the present disclosure is directed to a method of performing a contingency screening of an electrical power network. The method includes receiving a modular representation of the electrical power network, wherein the modular representation includes a zoomed-in representation having internal line connections and a zoomed-out representation having tie-line connections, receiving a line outage having an outage type, determining whether to recompute the zoomed-in representation, the zoomed-out representation, or both of the zoomed-in and zoomed-out representations as a function of the outage type, and recomputing, based on the line outage, the one(s) of the zoomed-in and zoomed-out representations determined at the determining step.

In yet another implementation, the present disclosure is directed to a machine-readable storage medium containing machine executable instructions for performing a method of performing a contingency analysis of an electrical power network. The machine-executable instructions includes a first set of machine-executable instructions for generating a mesh model of the electrical power network, a second set of machine-executable instructions for partitioning the mesh model into a plurality of areas, a third set of machine-executable instructions for transforming the plurality of areas into corresponding respective tree structures, wherein, during the transformation, each of the plurality of areas is disconnected from the mesh model, a fourth set of machine-executable instructions for connecting the tree structures with tie-lines to create a joined reference frame, and a fifth set of machine-executable instructions for performing a multi-area transformation on the joined reference frame.

In still another implementation, the present disclosure is directed to a machine-readable storage medium containing machine executable instructions for performing a method of performing a contingency screening of an electrical power network. The machine-executable instructions include a first set of machine-executable instructions for receiving a modular representation of the electrical power network, wherein the modular representation includes a zoomed-in representation having internal line connections and a zoomed-out representation having tie-line connections, a second set of machine-executable instructions for receiving a line outage having an outage type, a third set of machine-executable instructions for determining whether to recompute the zoomed-in representation, the zoomed-out representation, or both of the zoomed-in and zoomed-out representations as a function of the outage type, and a fourth set of machine-executable instructions for recomputing, based on the line outage, the one(s) of the zoomed-in and zoomed-out representations determined by the third set of machine-executable instructions.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
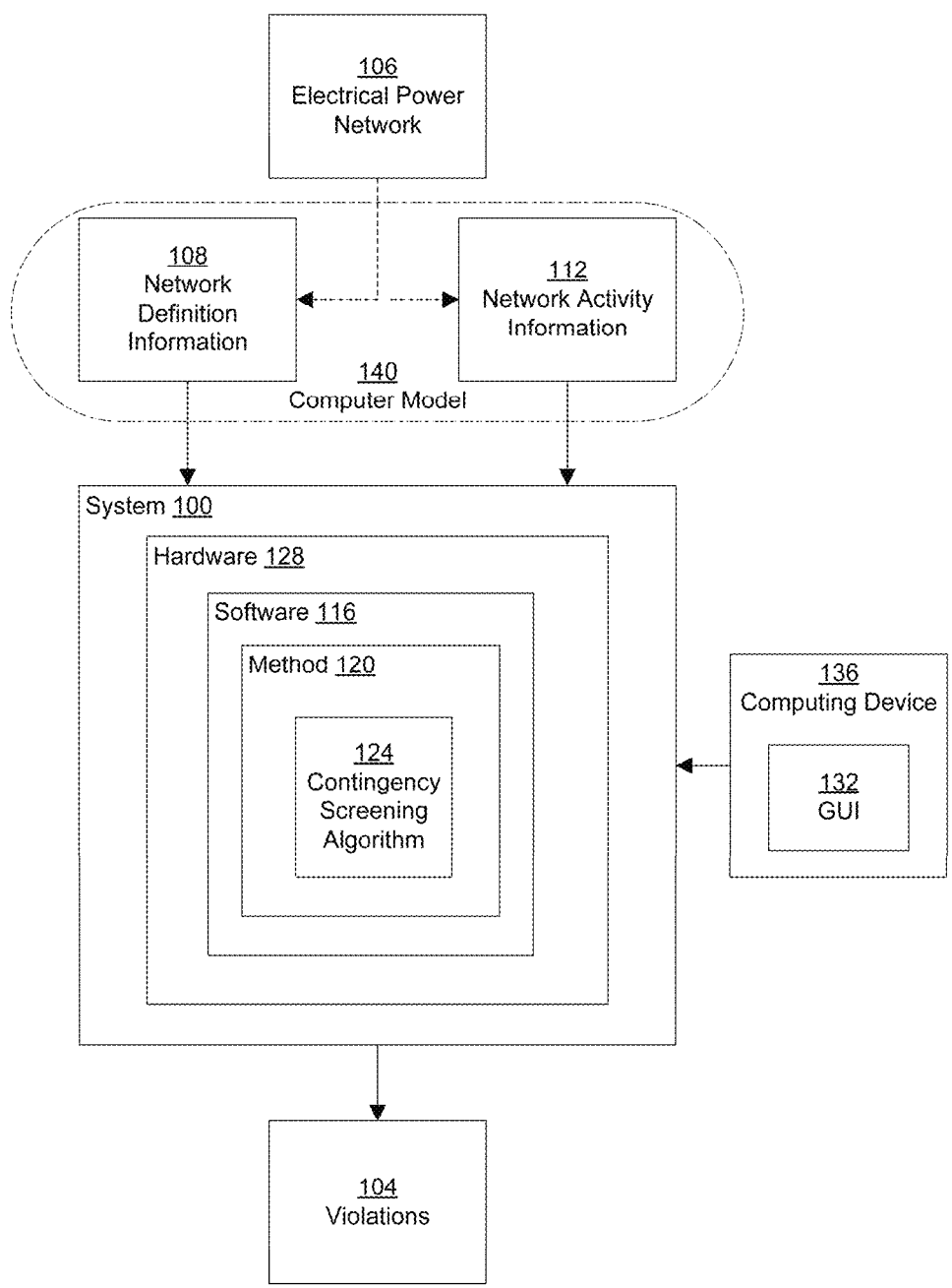
FIG. 1 is a high-level block diagram of a contingency screening system made in accordance with the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present invention include software tools and techniques for automated detection of violations through contingency screening in a multi-control area system using coordinated "DC" power flow. Through the invention, power flow calculations are decomposable and can be performed in a modular manner; this enables calculations to be performed on the scale of minutes or hours rather than the days or weeks associated with traditional contingency screening. When computations are distributed, such as in cloud-computing and/or decentralized computing, for example, among multiple independent system operators (ISOs) or any other suitable participants, or if available computing power is very large, calculation times for performing contingency screening using the invention can be reduced tenfold or more for very large scale power grids; actual timing improvements will necessarily be system-specific and will depend on the particular computer hardware used. Not only does this allow for more timely detection of contingencies that could cause security violations, but it also allows for substantially near-real-time calculations of contingencies. The latter can be used to, for example, detect potential security violations in highly variable electrical systems, such as during periods of high wind or electrical storms, such that response times to both security violations and physical outages can be significantly reduced.

The present invention can be used by regional entities in order to monitor trades between individual utilities or control areas; this can be performed through the use of loop flow calculations and information, for example, described further below. The invention can also be used by public utility commissioners, the Federal Energy Regulatory Commission (FERC), or other entities in creating quantifiable regulatory rules for power trading. In some aspects, due to its modular nature, the present invention enables power companies, ISOs, and others to be able to share a minimum of information with other entities while retaining the ability to perform speedy contingency screening. Another advantage of the modular nature of the invention is that it can be used by utilities/control areas in order to perform power trades/transactions without having to exchange economically sensitive data by, for example, exchanging loop flow calculations/information. In other aspects, the present invention may be used to quickly detect areas with potential security violations in order to hone in on those areas and perform more in-depth AC power flow calculations on them. In still other aspects, the present invention may interface directly with more in-depth AC power flow systems and work in unison with those systems in order to avoid security violations and other undesirable conditions and/or situations. These and other aspects of the present invention will become apparent to those skilled in the art after reading this entire disclosure.

Figure 2:
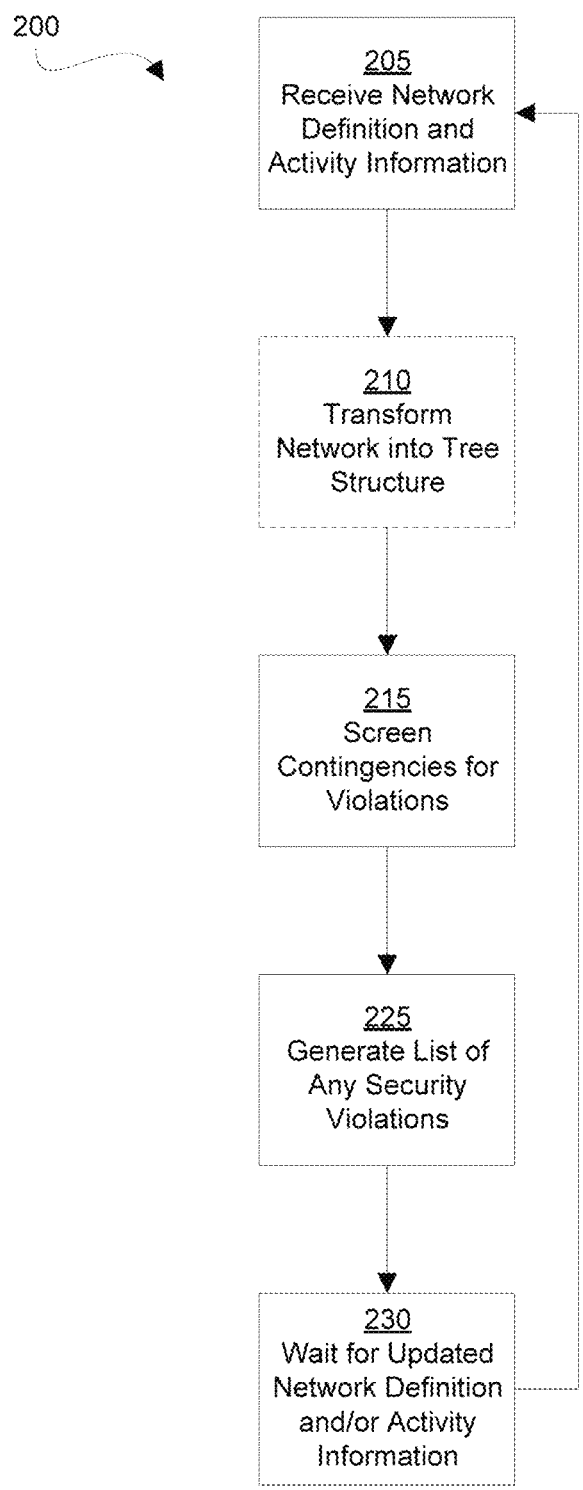
FIG. 2 is a flow diagram illustrating a method of contingency screening that can be implemented by the contingency screening system of FIG. 1.

Reference is now made to FIG. 1, which illustrates a system 100 for performing contingency screening in order to identify security violations 104 in an electrical power network 106. As described below in more detail, security violations 104 are identified by analyzing network definition information 108 and network activity information 112 that are determined as a function of the electrical power network under consideration. As will become readily apparent from reading this entire disclosure, system 100 includes software 116 for performing a method 120 of identifying security violations in a network by utilizing a contingency screening algorithm 124. FIG. 2 illustrates a contingency screening method 200 that is suitable for use as method 120 of FIG. 1. Method 200 is described below in detail. However, before describing method 200 and with continuing reference to FIG. 1, system 100 also includes suitable hardware 128 for executing software 116. In this context, hardware 128 includes all of the corresponding requisite functionality of the physical devices themselves. As those skilled in the art will readily appreciate from reading this entire disclosure, method 120 can be implemented in any suitable computer-based environment, such as in a network of computing devices or in a single computing device. Thus, hardware 128 can include a broad range of computing devices. A network of two or more of such devices can include any one or more types of networks, including, but not limited to, a global communications network (such as the Internet), a wide-area network, a local-area network, and a telecommunications network, among others. In this connection, those skilled in the art will also recognize the myriad of ways that the steps of method 120 can be implemented across a network. For example, if any steps of method 120 are implemented on one or more servers, they may be performed by suitable software residing on, provided by, and/or executed by such server(s). Such software can include a software application, a software module (such as a plugin to another software application, such as a computer modeling application, web browser, etc.), and/or a software code segment. In many cases, the same or similar software, or any portion thereof, can be implemented on a desktop computer, a laptop computer, and a tablet computer. As another example, various steps of method 120 can be performed by one or more mobile apps running, on, for example, a smartphone or tablet computer, and provided the ability to communicate with one or more other computing devices running software that performs one or more other steps of the method.

In a particular embodiment, all steps of method 120 can be performed by a single computing device, such as a desktop computer or server, running an integrated software application that performs all steps of method 120 and that may also include computer-modeling functionality for modeling electrical power network 106. In another embodiment, some steps of method 120 can be performed on a first computing device, whereas other steps of the method are performed on a second computing device located remotely from the first computing device across a network. Those skilled in the art will understand how to implement any variation reasonably conceivable using only known programming techniques and this disclosure as a guide. Consequently, it is not necessary to describe every potential variation for skilled artisans to practice the present invention to the fullest scope accorded by the appended claims. Regardless of the type of hardware 128 used to implement contingency screening software 116 made in accordance with the present invention, the hardware works in combination with and under the control of such software to form contingency screening system 100, which provides functionality described herein.

Referring now to FIG. 2, and also to FIG. 1 for context and noting that 100-series element numerals correspond to FIG. 1 and 200-series numerals correspond to FIG. 2, at step 205 of method 200, network definition information 108 and network activity information 112 may be received by software 116 from an external source (not shown), such as, for example, a machine-readable storage medium, a separate computing device, and/or a separate piece of software running on the same hardware 128 as contingency screening software 116, which may be programmed to perform contingency screening algorithm 124. Network definition information 108 can include, for example, a set of two matrices: one defining loads and nodes of electrical power network 106 and one defining lines and interconnections in the network. Network activity information 112 can include, for example, a matrix defining generators in an electrical power network 106.

Contingency screening method 200 can be initiated in any suitable manner, such as via a user interface 132 presented to a user on a computing device 136 accessible to the user. In this example, software 116 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at an appropriate location. The manner of selection will depend on the particular hardware 128 and configuration of software 116 being used on the user's computing device. As alluded to above, the user interface containing the user-selectable control can be provided application-specific software running on the user's device or a web-browser or other remote-access means that allows the user to access contingency screening software functionality remotely from the user's device. As another example, contingency screening method can be initiated through a more passive request, such as the user opening an application (not shown) of software 116 that provides a user interface for, for example, performing contingency screening tasks and viewing contingency screening information and results; once the user opens the application, software 116 may initiate various ones of its contingency screening functionalities.

Figure 3:
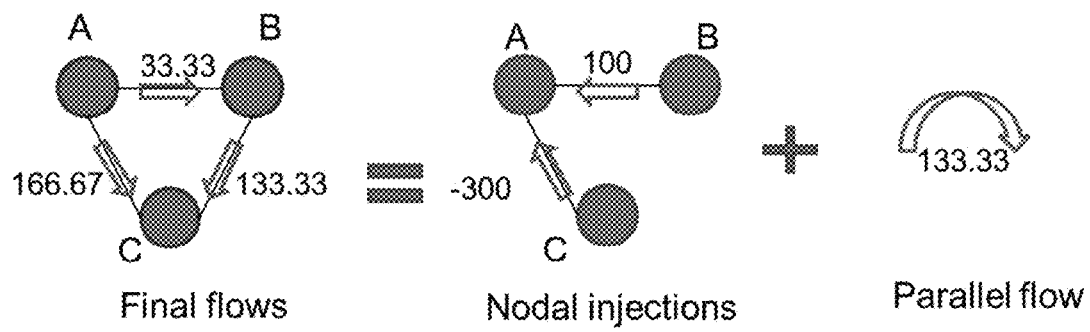
FIG. 3 illustrates a relationship between physical line flows, spanning tree flows and loop flows.

At step 210, once network definition information 108 and activity information 112 have been received, thereby creating a computer model 140 of electrical power network 106, software 116 uses that information to transform the network model into tree structures (see, e.g., FIG. 4) using a suitable algorithm such as, for example, the algorithm illustrated in and described below with respect to FIG. 3. Step 210 is typically performed upon initialization of method 200, but may be optional in further iterations of method 200, depending on whether tree structures need to or are desired to be reconfigured or recalculated. Such tree structures can be generated randomly, based on weights associated with line contract paths, and/or customized by calculating a minimum spanning tree based on the topology of electrical power network 106; however, in order to minimize recalculations, once a tree structure has been determined for a given area, the same tree structure must be used for that area for calculating the base case as is used for calculating contingency cases.

At step 215, software 116 screens network contingencies for violations by performing a CA as a function of network definition information 108 and network activity information 112. First, reference frames are calculated for the network using an algorithm such as, for example, the algorithm illustrated in and described below with respect to FIGS. 4-11. Reference frames are a series of network transformations corresponding to ascending levels of abstraction of electrical power network 106. A reference frame emphasizes network properties relevant to the phenomenon that it models and can be characterized with, for example, a line flow vector F, a phase angle difference vector Δ, and a reactance matrix X. Although the positions and properties of the lines change throughout transformations, each reference frame is physical in the sense that all physical laws, namely, Kirchhoff's current law (KCL), Kirchhoff's voltage law (KVL), and Ohm's law, must be satisfied. In order to transform a given reference frame into a different reference frame, a connection matrix may be calculated relating the two frames using an algorithm such as, for example, the algorithm illustrated in and described below with respect to FIGS. 4-11. Such a connection matrix can be derived from an incidence matrix of network definition information, such as a matrix defining the lines and interconnections of the network, or in any other suitable manner.

In order to enable modular execution of power flow calculations, power flows for all areas (or modules) need to be calculated while they are disconnected from the rest of the network. However, the resulting local solution is not correct, because the effect of interconnects between areas is not taken into account. Software 116 simplifies each area's internal structure by converting it into a tree using an algorithm such as, for example, algorithm illustrated in and described below with respect to FIGS. 6-7. At that point, the simplified modules are modeled with interconnecting tie-lines to include interconnections. Software 116 then simplifies the resulting network of connected simplified modules by converting it into a tree. The transformation proceeds until the interconnected network has been fully converted into a tree. The final tree representation is a minimal representation of the original network that integrates interconnections and that contains information that can be translated for use in updating power flow solutions in any reference frame and for any given area. Calculation of power flow starts with the most abstracted frame in which all flows have to be known. Once nodal injections are converted into tree flows, power flow can be solved by converting the flows from the most abstracted reference frame to any other frame through use of connection matrices corresponding to the most abstracted reference frame, the desired reference frame, and any reference frame(s) in-between. This allows for the computation of each physical line flow of each individual area.

In order to perform CA, coordinated and step-wise execution of power flow analysis is performed, enabled by the modular nature of the system. Since power flow is not executed in "one shot," results can be reused from areas unaffected by a given contingency. Each area can manage its own topology in normal operation or in the case of an outage. An outage that occurs in one area does not directly affect the topologies in other areas. Intra-area results, once calculated for the base case (or normal operation), can be reused in CA for areas unaffected by a given contingency. Only areas affected by the contingency must be recalculated; this minimizes the number of necessary computations and matrix inversions for a given contingency, while data from the original system (base case or normal operation) can be reused for all other areas.

At step 225, software 116 generates a list of any detected security violations 104 based on reliability criteria, such as N−1 reliability criteria, and "DC" power flow limits, which may be based on thermal limits, either of which may be contained in a matrix defining the lines and interconnections of the network, or in any other suitable manner. At step 230, the system waits for updated network definition information 108 and/or updated network activity information 112; upon indication of changes in this information and/or at the request of a user, method 200 returns to step 205 to receive the updated information and to recalculate contingency violations. It is particularly emphasized that the order of performance of the foregoing steps of method 200 need not be as shown. Rather, they may be implemented in any logical order that results in a desired implementation of contingency screening.

Exemplary Contingency Screening

Whereas the foregoing description describes various aspects of the present invention generically while providing some examples of ways those aspects can be implemented, the following description is primarily directed to a particular detailed example and particular algorithms. While this embodiment is described in fairly extensive detail, it should be understood that it is merely illustrative and should not be considered as limiting the much broader scope of the invention. Indeed, as alluded to above, the specific instantiations of the features and software described below are merely one set of such instantiations and features, and those skilled in the art will readily understand that many variations of each individual instantiation and feature are possible, as are differing combinations of these instantiations and features and other instantiations and features.

As will become apparent from reading the following description of this detailed embodiment, the example described below includes descriptions of algorithms that enable contingency screening in a multi-control area system using coordinated "DC" power flow.

Exemplary contingency screening methods involve performing tree transformations, calculating reference frames and connection matrices, determining reactance matrices, X, flow vectors, F, and angle difference vectors, Δ. The tree transformation referred to above will be illustrated on a three area system illustrated on the left side of the equals sign in FIG. 3. The goal of the algorithm is to convert the given network (the physical network) into a tree like that shown on the right of the equals sign in FIG. 3. The algorithm consists of bidirectional transformations between five reference frames; however, a different number of frames could potentially be used. The forward direction from lower to higher reference frames (i.e., from left to right in FIG. 5) creates connection and reactance matrices and will be called "forward transformation" herein. The backward direction (i.e., from right to left in FIG. 5) solves the power flow by substituting line flows from higher to lower reference frames until all flows have been computed in the physical network and will be referred to as "backward substitution" herein.

Each frame can be characterized by a line flow vector, F, a vector of phase angle differences, Δ, and a reactance matrix, X, respectively. A transformation between two reference frames is defined in such a way that the law of conservation of power has to be satisfied. Conversion between reference frames is enabled by use of a connection matrix corresponding to the particular frames involved. If we denote flows, phase angle differences, and reactances as $F^1$, $\Delta_1$, and $X_{11}$, respectively, in reference frame 1, and $F^2$, $\Delta_2$, and $X_{22}$, respectively, in reference frame 2, and the connection matrix defined between frames 1 and 2 as $C_{12}$, equations that relate these variables in two reference frames are given by the following Equations 1-3.

$$F^1 = C_{12} \cdot F^2 \quad (1)$$

$$\Delta_2 = C_{12}^T \cdot \Delta_1 \quad (2)$$

$$X^{22} = C_{12}^T \cdot X_{11} \cdot C_{12} \quad (3)$$

Figure 6:
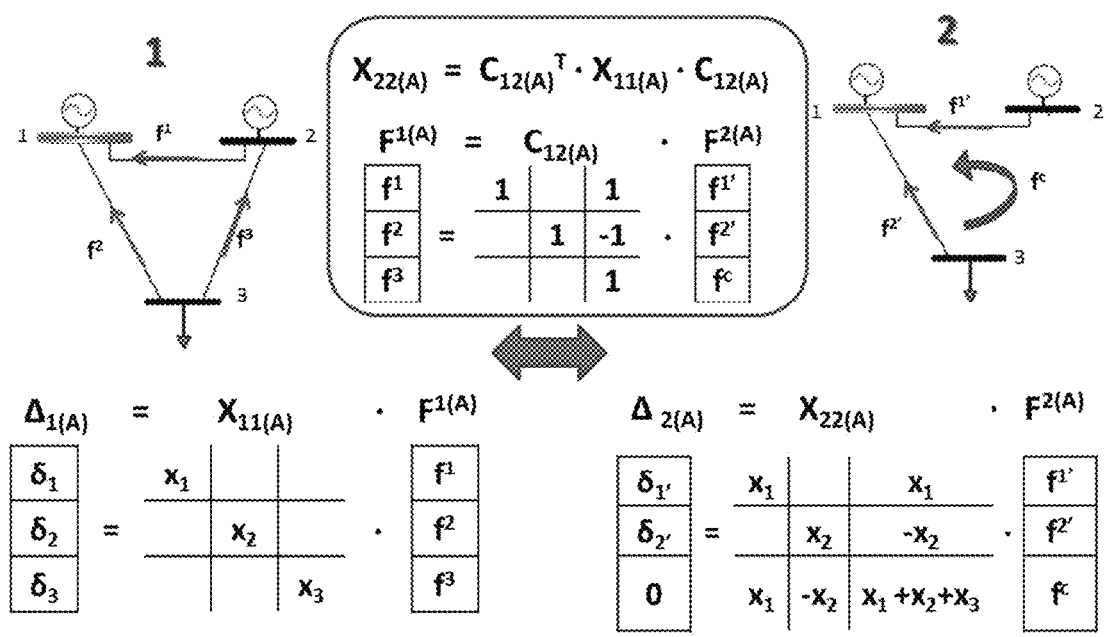
FIG. 6 illustrates an exemplary implementation of an algorithm for converting network definition and activity information between first and second frames for area A of FIG. 3.
Figure 7:
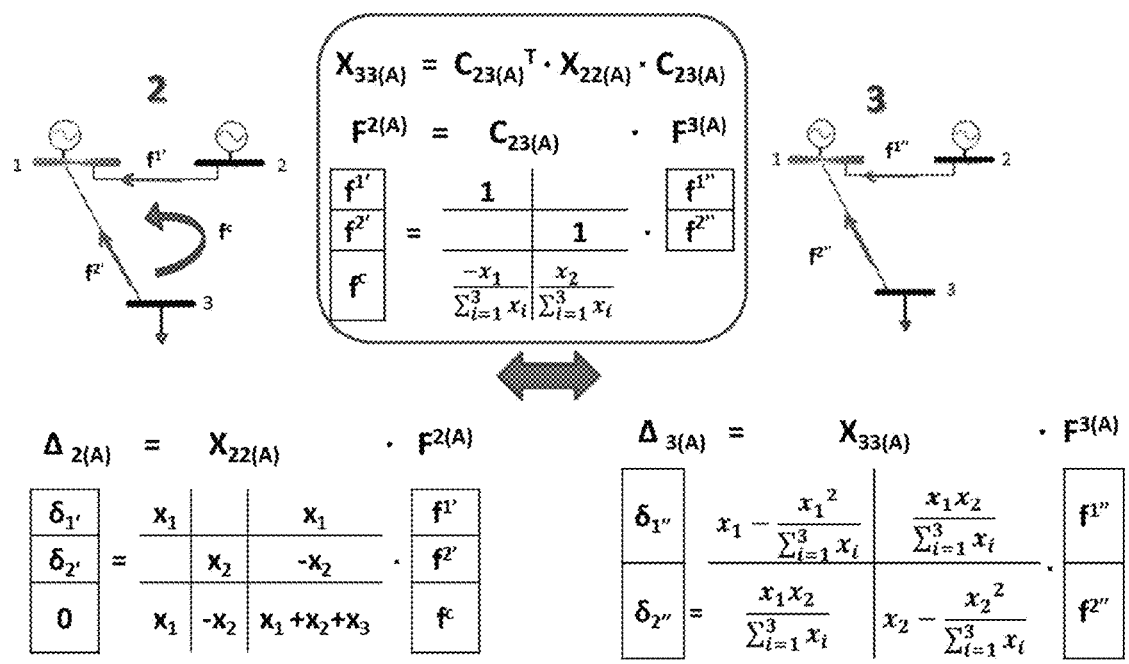
FIG. 7 illustrates an exemplary implementation of an algorithm for converting network definition and activity information between second and third frames for area A of FIG. 3.
Figure 8:
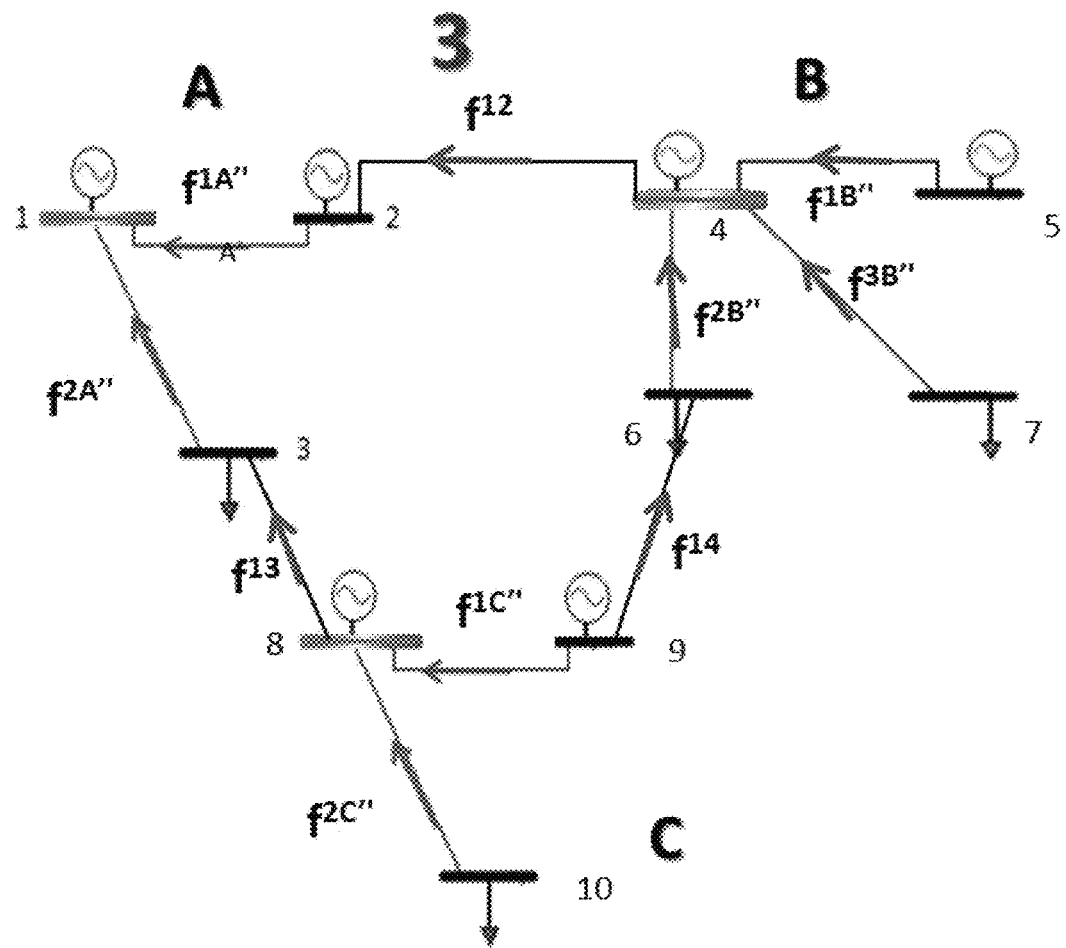
FIG. 8 illustrates third-frame trees of areas A, B, and C of FIG. 3 interconnected with tie-lines, forming a joined third-frame tree.

The goal of a single area transformation is to transform the physical network of an area into a tree while it is disconnected from the original network. The first transformation starts with forming a spanning tree which is followed by detection of basic loops. Loops can be detected by, for example, performing a depth-first search (DFS). The spanning tree has radial topology and is selected in such a way that the root of the tree lays in the slack bus of that area. Once the tree has been selected, the basic loops are determined uniquely. One basic loop goes through exactly one line that has been removed from the network in order to create a tree. Consequently, reference frame 1 represents the physical network with the actual power flows while reference frame 2 is a network representation with spanning tree branches and basic loops. Reactance matrix ($X_{11}$) in reference frame 1 contains line reactances along the main diagonal. A method for generating connection matrix $C_{12}$ will be explained in the example of area A of FIG. 4. Suppose that line flows in reference frame 1 are $f^1$, $f^2$ and $f^3$ and in reference frame 2 are $f^{1'}$, $f^{2'}$, and $f^c$. Each line flow in reference frame 1 has a corresponding linear combination of line flows in reference frame 2. For example, flow $f^1$ from reference frame 1 is a sum of flows $f^{1'}$ and $f^c$ from reference frame 2. Similarly, flow $f^2$ is a subtraction of $f^{2'}$ and $f^c$. This process is continued until matrix $C_{12}$ is completed as shown in FIG. 6. According to KVL in reference frame 2, the sum of phase angle differences across the basic loops are equal to zero. As a consequence, flows in reference frame 2 ($F^2$) are linearly dependent. Moreover, the loop flow ($f^c$) can be expressed as a linear combination of the independent tree flows. Solving the equation created by the last row of the Ohm's law equation, the loop flow ($f^c$) can be expressed as a linear combination of the tree flows ($f^{1'}$ and $f^{2'}$) as shown in Equation 4, below.

$$f^c = -\frac{x_1}{x_1 + x_2 + x_3} \cdot f^{1'} + \frac{x_2}{x_1 + x_2 + x_3} \cdot f^{2'} \quad (4)$$

Figure 9:
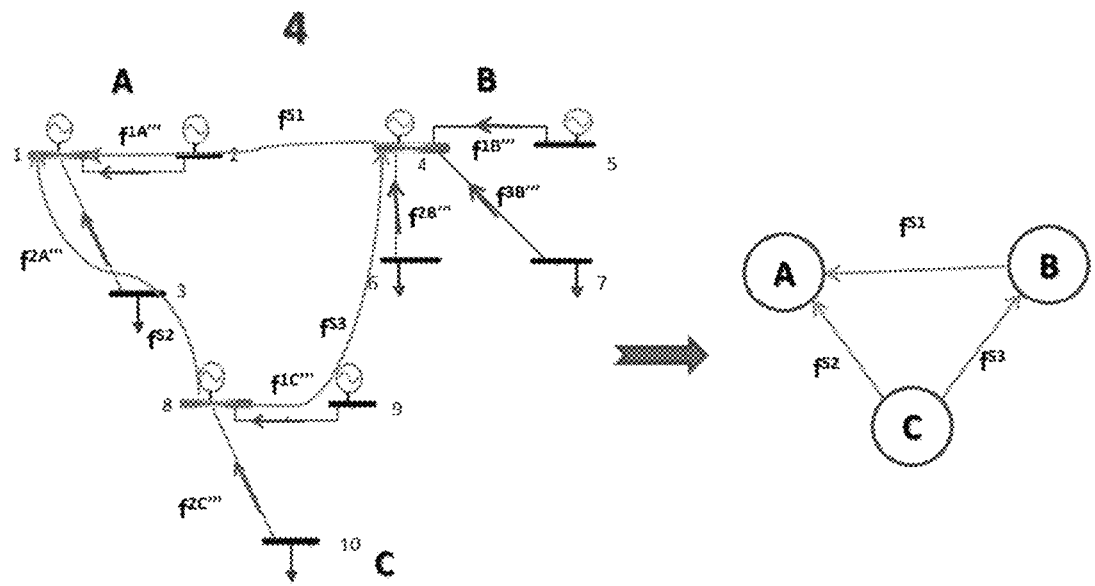
FIG. 9 illustrates a fourth-frame tree of the joined third-frame tree of FIG. 8.
Figure 10:
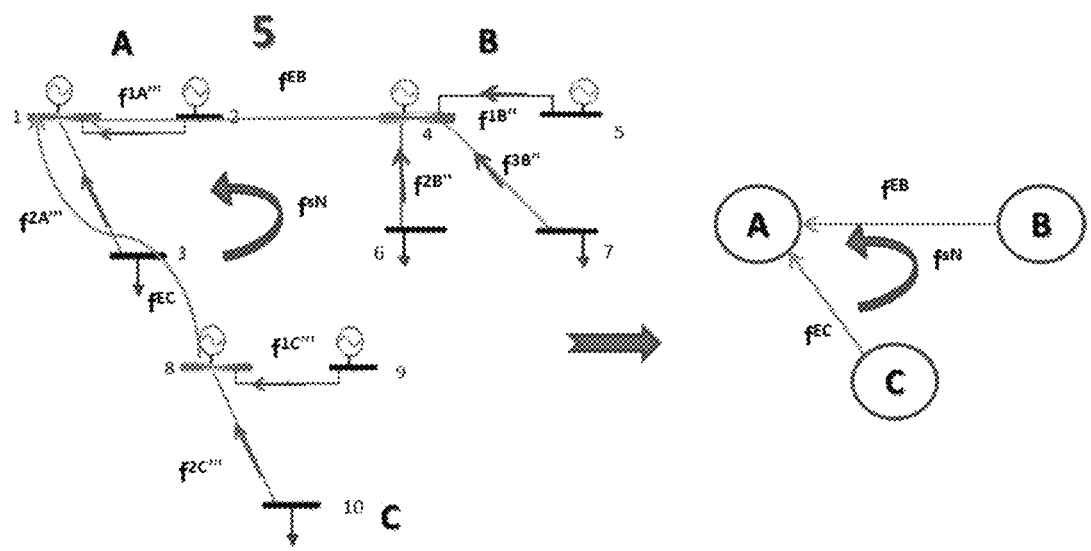
FIG. 10 illustrates a fifth-frame tree of the fourth-frame tree of FIG. 9.

By eliminating redundant flows from vector $F^2$, a new reference frame 3 can be introduced. This is a minimal representation of the original meshed network in reference frame 1. Using Equation 4, the connection matrix between reference frames 2 and 3 can be established as in FIG. 7. Interconnecting trees with tie-lines do not guarantee that the obtained network is a tree. For this reason, the algorithm proceeds with a transformation described for the multi-area case. After all areas have performed single area transformations, their tree representations are connected with tie-lines to create joined reference frame 3 as in FIG. 8. The reactance matrix of the newly formed network is created by arranging reactance matrices of all areas and the tie-lines along the main diagonal. The transformation into reference frame 4 traces the connection between slack buses of each of the two interconnected areas (FIG. 9). Since the next step assumes "zooming-out" from areas and representing them as black boxes, the assumption that their slack buses are connected (as shown in FIG. 9) provides a uniform way of representing connections between two areas.

At this point, the zoomed-out representation of the network is identical to the single area case of the 3-bus network shown in FIG. 6 (here areas correspond to buses). Similarly, the loop flow can be expressed as a linear combination of the tree tie-line flows. New reference frame 5 is therefore introduced and shown in FIG. 10. Tree flows represent nodal injections and the circulating flow represents inter-area loop flow. This loop flow is noted as $f^{sN}$ and is computed similarly to $f^c$ in the single area transformation. Since Ohm's law holds in reference frame 5, by solving the last row, $f^{sN}$ can be expressed as a linear combination of all spanning tree flows.

Once the tree transformations discussed above have been completed, power flow computation can take place from higher to lower reference frames starting from reference frame 6. The computation of power flow starts with reference frame 6 in which all internal and external spanning tree flows have to be known. Conventionally, inputs into the power flow problem are nodal power injections. It can be shown that for a selected spanning tree, there exists a bijective mapping between specified nodal injections and spanning tree flows. In order to enable full network tree transformation, each area needs to exchange with the zoomed-out level their tree representation with the corresponding tree reactance matrix, $X_{33(i)}$ and all internal spanning tree flows, $F^{n(i)}$, translated from its nodal injections. After the zoomed-out transformations, updated spanning tree flows, $F^{3(i)}$, are sent to the individual areas for computing their physical line flows, $F^{1(i)}$. Once nodal injections are converted into internal and external tree flows, power flow can be solved. Firstly, internal and external spanning tree flows, $F^6$, obtained from specified nodal injections, are mapped into flows in reference frame 5. Secondly, flows from reference frame 5 are mapped across reference frame 4 to reference frame 3 using the corresponding connection matrices. Further on, reference frame 3 acquires updated internal spanning tree flows, $F^3$, computed from frame 4. Finally, each individual area maps these tree flows into physical line flows using its own connection matrices.

Line outages can be internal or external. An internal line outage happens inside of one area, whereas an external one is a tie-line outage captured on the zoomed-out level. If a line outage happens, only the forward transformation of the affected area has to be repeated. Only one area is required to repeat the steps of the single area transformation. New connection matrices $C_{12}$ and $C_{23}$ have to be generated, which requires the computation of new reactance matrices of that area: $X_{22}$ and $X_{33}$. Since the tree representation of the area in which the contingency is being analyzed has not changed, forward transformations of the zoomed-out level can re-use connection matrices created for the original network. This is how the computational overhead caused by a contingency is minimized and handled in an intuitive way.

Figure 4:
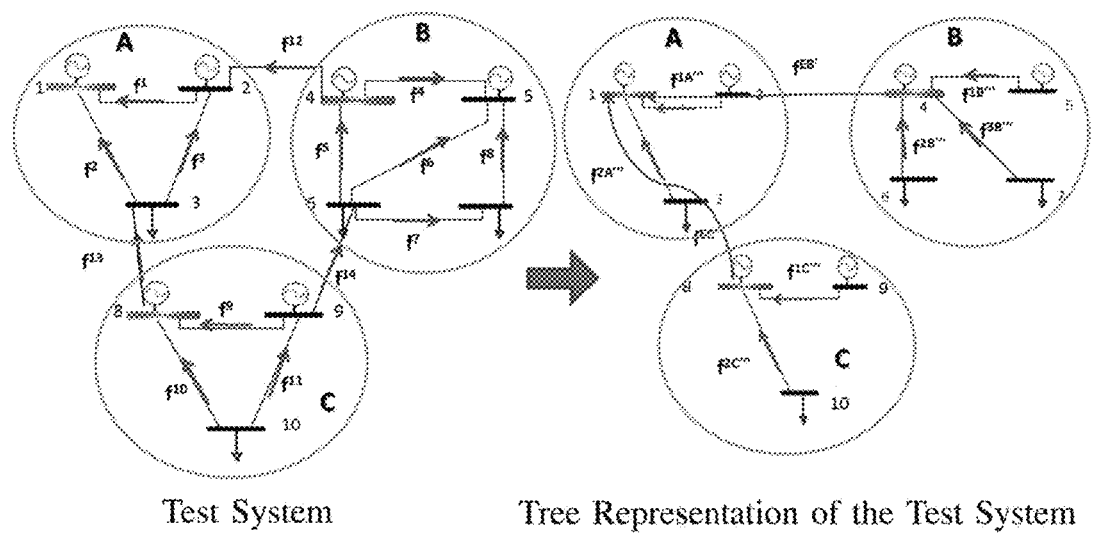
FIG. 4 illustrates a test system and a corresponding tree representation of that test system.
Figure 5:
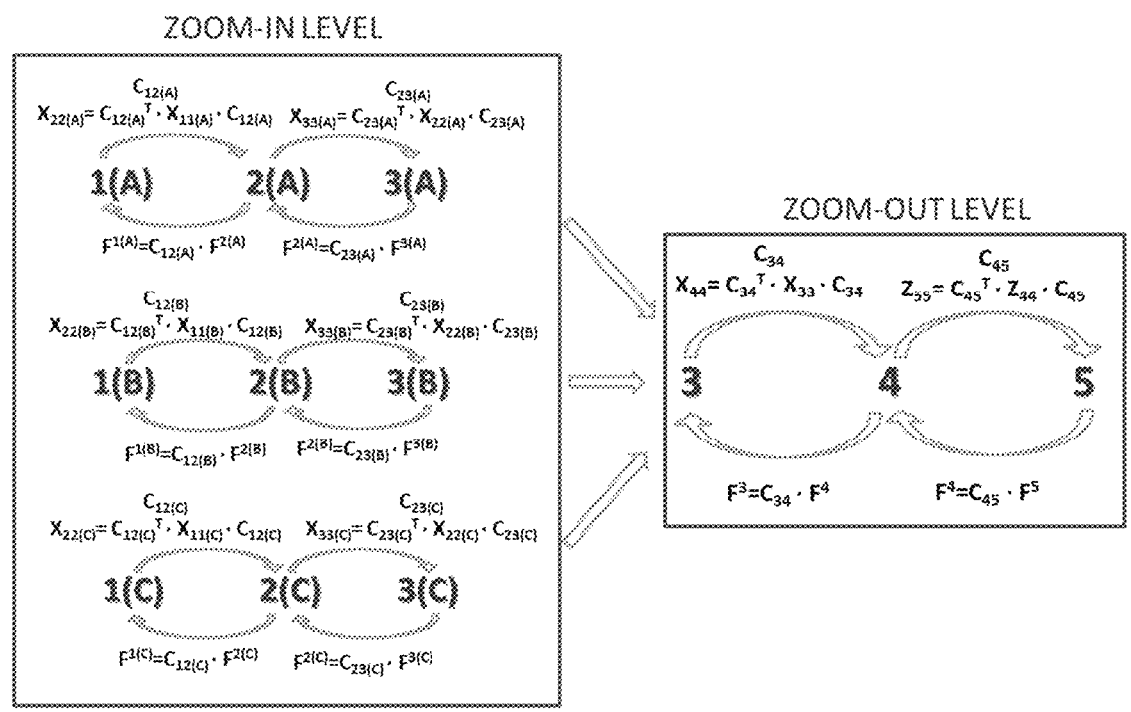
FIG. 5 illustrates a flow diagram illustrating an algorithm for converting network definition and activity information between frames.
Figure 11:
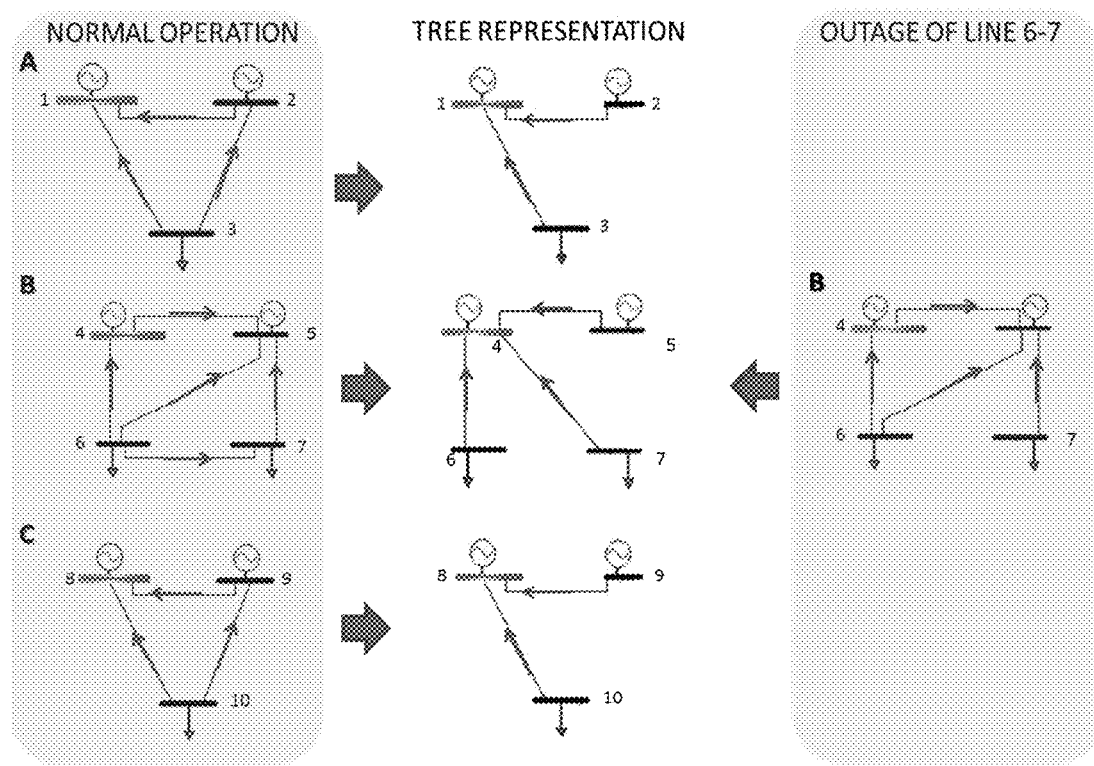
FIG. 11 illustrates how tree representations of a particular area (area B) can be retained during an outage.

Consider a contingency caused by tripping of the line between buses 6 and 7 in area B of FIG. 4. The tree transformation has to be repeated in area B, but the resulting tree will remain the same, as shown in FIG. 11. On the zoomed-out level in the forward transformation, system reactance matrices need to be updated as well. A new block $X_{33(B)}^{out}$ is replaced in the reactance matrix of joined reference frame 3 to create $X_{33}^{out}$ as in the following Equation 5.

$$X_{33}^{out} = \begin{array}{|c|c|c|c|} \hline X_{33(A)} & 0 & 0 & 0 \\ \hline 0 & X_{33(B)}^{out} & 0 & 0 \\ \hline 0 & 0 & X_{33(C)} & 0 \\ \hline 0 & 0 & 0 & X_{tie\_line} \\ \hline \end{array} \quad (5)$$

Since the tree representation of area B is unchanged, the $C_{34}$ and $C_{45}$ matrices remain unchanged. However, in reference frames 4 and 5, reactance matrices are updated using the new reactance matrix from reference frame 3 as in Equations 6 and 7, below. Since inter-area loop flows are affected by the change in the $X_{55}$ matrix, power flows need to be updated though backward substitution (first on the zoomed-out and then on the zoomed-in level).

$$X_{44}^{out} = C_{34}^T \cdot X_{33}^{out} \cdot C_{34} \quad (6)$$

$$X_{55}^{out} = C_{45}^T \cdot X_{44}^{out} \cdot C_{45} \quad (7)$$

Line outage of a tie-line is considered an external line outage. This case requires recalculations only on the zoomed-out level. This means that all single area transformations remain unchanged and only the steps of multi-area transformations need to be repeated. Since the topological change happened on the joined reference frame 3, new connection matrices of the zoomed-out level need to be calculated along with reactance matrices. Suppose that in our example, the tie-line between buses 2 and 4 is lost. The only block that is affected by an external change is $X_{tie\_line}$, which remains a diagonal matrix containing tie-line reactances. The dimension of this block is reduced by 1 when a tie-line goes out. New reactance matrix $X_{33}$ is shown in Equation 8, below.

$$X_{33}^{out} = \begin{array}{|c|c|c|c|} \hline X_{33(A)} & 0 & 0 & 0 \\ \hline 0 & X_{33(B)} & 0 & 0 \\ \hline 0 & 0 & X_{33(C)} & 0 \\ \hline 0 & 0 & 0 & X_{tie\_line}^{out} \\ \hline \end{array} \quad (8)$$

Reactance matrices of reference frames 4 and 5 are computed using new connection matrices and $C_{34}^{out}$ and $C_{45}^{out}$ as in Equations 9 and 10 below. New reactance matrix $X_{55}$ is used for computing new loop flows, which are used to update power flow solutions on the zoomed-out level and inside individual areas. In our example, when the tie-line connecting buses 2 and 4 is out, the network is already converted into a tree and the algorithm stops in reference frame 4. Therefore, flow vectors in reference frame 4 contain mapped nodal injections, and, as such, the only connection matrix that needs to be recomputed is $C_{34}^{out}$.

$$X_{44}^{out} = C_{34}^{out,T} \cdot X_{33}^{out} \cdot C_{34}^{out} \quad (9)$$

$$X_{55}^{out} = C_{45}^{out,T} \cdot X_{44}^{out} \cdot C_{45}^{out} \quad (10)$$

For completeness, generalized versions of Equations 1-3 are presented in The following Equations 11-13. For numerical examples of the algorithms contained in this disclosure, see U.S. Provisional Patent Application Ser. No. 61/742,156, filed on Aug. 3, 2012, and titled "Contingency Screening in a Multi-Control Area System Using Coordinated DC Power Flow," which is incorporated herein by reference in its entirety.

$$F^a = C_{ab} \cdot F^b \quad (11)$$

$$\Delta_b = C_{ab}^T \cdot \Delta_a \quad (12)$$

$$X_{bb} = C_{ab}^T \cdot X_{aa} \cdot C_{ab} \quad (13)$$

Exemplary Computing Device

As noted above aspects and embodiments described herein may be conveniently implemented using one or more machines (e.g., one or more computing devices/computer systems that are part of a contingency screening system, such as system 100 of FIG. 1) including hardware and special programming according to the teachings of the present specification, as will be apparent to those of ordinary skill in the computer arts. Appropriate software coding can readily be prepared by skilled programmers based on the teachings of the present disclosure, as will be apparent to those of ordinary skill in the software arts.

Such software may be, for example, a computer program product that employs one or more a machine-readable hardware storage mediums. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable hardware storage medium include, but are not limited to, a magnetic disk (e.g., a conventional floppy disk, a hard drive disk), an optical disk (e.g., a compact disk "CD", such as a readable, writeable, and/or rewritable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. Such a data signal or carrier wave would not be considered a machine-readable hardware storage medium. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof.

Figure 12:
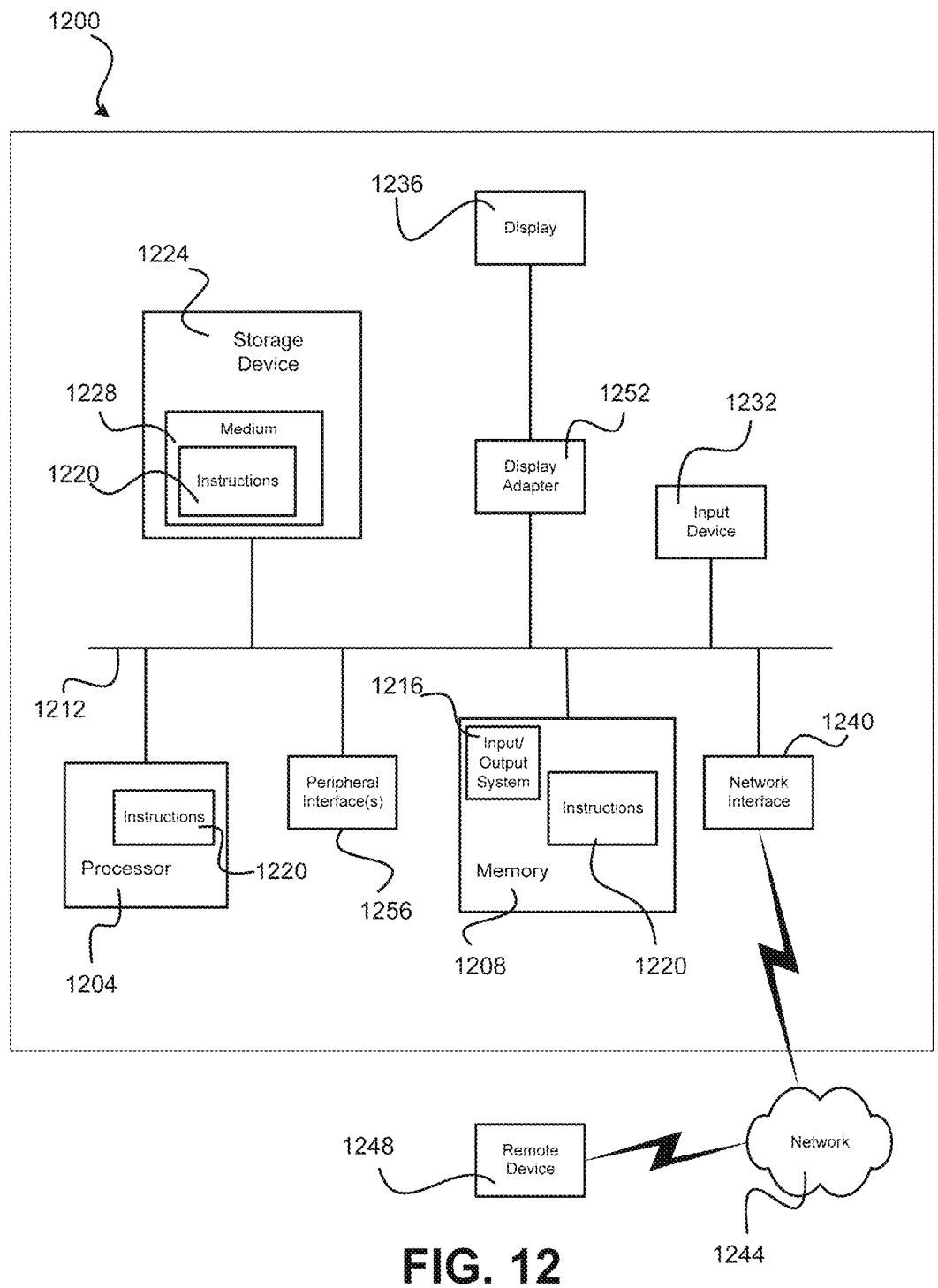
FIG. 12 is a high-level schematic diagram of a computing device that can be used as any one of the computing devices described herein.

FIG. 12 shows a diagrammatic representation of one exemplary embodiment of a computing device 1200, within which a set of instructions for causing one or more processors 1204 to perform any one or more of the functionalities, aspects, and/or methodologies of the present disclosure. It is also contemplated that multiple computing systems may be utilized to implement a specially configured set of instructions for performing any one or more of the functionalities, aspects, and/or methodologies of the present disclosure in a distributed computing matter.

Computing device 1200 can also include a memory 1208 that communicates with the one or more processors 1204, and with other components, for example, via a bus 1212. Bus 1212 may include any of several types of bus structures including, but not limited to, a memory bus, a memory controller, a peripheral bus, a local bus, and any combinations thereof, using any of a variety of bus architectures.

Memory 1208 may include various components (e.g., machine-readable hardware storage media) including, but not limited to, a random access memory component (e.g., a static RAM "SRAM", a dynamic RAM "DRAM", etc.), a read only component, and any combinations thereof. In one example, a basic input/output system 1216 (BIOS), including basic routines that help to transfer information between elements within computing system 1200, such as during start-up, may be stored in memory 1208. Memory 1208 may also include (e.g., stored on one or more machine-readable hardware storage media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computing device 1200 may also include a storage device 1224, such as, but not limited to, the machine readable hardware storage medium described above. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computing system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computing device 1200. In one example, software instructions 1220 may reside, completely or partially, within machine-readable hardware storage medium 1228. In another example, software instructions 1220 may reside, completely or partially, within processors 1204.

Computing device 1200 may also include an input device 1232. In one example, a user of computing system 1200 may enter commands and/or other information into computing system 1200 via one or more input devices 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device(s) 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device(s) 1232 may include a touch screen interface that may be a part of or separate from display(s) 1236, discussed further below. Input device(s) 1232 may be utilized as a user selection device for selecting one or more graphical representations in a graphical interface as described above.

A user may also input commands and/or other information to computing device 1200 via storage device 1224 (e.g., a removable disk drive, a flash drive, etc.) and/or network interface device(s) 1240. A network interface device, such as any one of network interface device(s) 1240, may be utilized for connecting computing system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network, a telephone network, a data network associated with a telephone/voice provider, a direct connection between two computing devices, and any combinations thereof. A network, such as network 1244, may employ a wired and/or a wireless mode of communication. In general, any network topology may be used. Information (e.g., data, software instructions 1220, etc.) may be communicated to and/or from computing system 1200 via network interface device(s) 1240.

Computing device 1200 may further include one or more video display adapter 1252 for communicating a displayable image to one or more display devices, such as display device(s) 1236. Examples of a display device include, but are not limited to, a liquid crystal display (LCD), a cathode ray tube (CRT), a plasma display, a light emitting diode (LED) display, and any combinations thereof. Display adapter(s) 1252 and display device(s) 1236 may be utilized in combination with processor(s) 1204 to provide a graphical representation of a utility resource, a location of a land parcel, and/or a location of an easement to a user. In addition to a display device, computing system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a THUNDERBOLT connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of performing a contingency screening of an electrical power network, the method comprising:
   receiving a previously computed, modular representation of the electrical power network, wherein the modular representation includes:
      a zoomed-in representation defined by a first plurality of variables and having internal line connections; and
      a zoomed-out representation defined by a second plurality of variables and having tie-line connections, wherein the first plurality of variables includes at least one variable not included in the second plurality of variables and at least one of the second plurality of variables is derived from a linear combination of line flows of two or more of the internal line connections;

receiving a line outage having an outage type, including receiving a line outage for which the outage type is an internal outage;

determining whether to recompute the zoomed-out representation or both of the zoomed-in and zoomed-out representations as a function of the outage type, including determining that both of the zoomed-in and zoomed-out representations need to be recomputed based on the internal outage; and recomputing, based on the line outage, the one(s) of the zoomed-in and zoomed-out representations determined at said determining step, including recomputing both of the zoomed-in and zoomed-out representations as a function of the internal outage;

wherein recomputing the zoomed-out representation includes recomputing the zoomed-in representation to account for an outage and performing a forward transformation as a function of the recomputed zoomed-in representation to produce a recomputed zoomed-out representation.

2. A method according to claim 1, wherein performing the forward transformation includes generating a reactance matrix and a connection matrix as a function of the recomputed zoomed-in representation.

3. A method according to claim 2, further comprising generating a reactance/connection matrix by arranging two or more reactance/connection matrices along a main diagonal of a matrix.

4. A non-transitory machine-readable storage medium containing machine-executable instructions for performing a method of performing a contingency screening of an electrical power network, said machine-executable instructions comprising:

a first set of machine-executable instructions for receiving a previously computed, modular representation of the electrical power network, wherein the modular representation includes:
 a zoomed-in representation defined by a first plurality of variables and having internal line connections; and
 a zoomed-out representation defined by a second plurality of variables and having tie-line connections,
 wherein the first plurality of variables includes at least one variable not included in the second plurality of variables and at least one of the second plurality of variables is derived from a linear combination of line flows of two or more of the internal line connections;

a second set of machine-executable instructions for receiving a line outage having an outage type, including machine-executable instructions for receiving a line outage for which the outage type is an internal outage;

a third set of machine-executable instructions for determining whether to recompute the zoomed-out representation or both of the zoomed-in and zoomed-out representations as a function of the outage type, including machine-executable instructions for determining that both of the zoomed-in and zoomed-out representations need to be recomputed based on the internal outage; and a fourth set of machine-executable instructions for recomputing, based on the line outage, the one(s) of the zoomed-in and zoomed-out representations determined by said third set of machine-executable instructions, including machine-executable instructions for recomputing both of the zoomed-in and zoomed-out representations as a function of the internal outage;

wherein said fourth set of machine-executable instructions include machine-executable instructions for recomputing the zoomed-in representation and performing a forward transformation as a function of the recomputed zoomed-in representation to produce a recomputed zoomed-out representation.

5. A non-transitory machine-readable storage medium according to claim 4, wherein said machine-executable instructions for performing a forward transformation include machine-executable instructions for generating a reactance matrix and a connection matrix as a function of the recomputed zoomed-in representation.

6. A method of performing a contingency screening of an electrical power network, the method comprising:

receiving a previously computed, modular representation of the electrical power network, wherein the modular representation includes:
 a zoomed-in representation defined by a first plurality of variables and having internal line connections; and
 a zoomed-out representation defined by a second plurality of variables and having tie-line connections,
 wherein the first plurality of variables includes at least one variable not included in the second plurality of variables and at least one of the second plurality of variables is derived from a linear combination of line flows of two or more of the internal line connections;

receiving a line outage having an outage type, including receiving a line outage for which the outage type is an internal outage;

determining whether to recompute the zoomed-out representation or both of the zoomed-in and zoomed-out representations as a function of the outage type, including determining that both of the zoomed-in and zoomed-out representations need to be recomputed based on the internal outage; and recomputing, based on the line outage, the one(s) of the zoomed-in and zoomed-out representations determined at said determining step, including recomputing both of the zoomed-in and zoomed-out representations as a function of the internal outage;

wherein recomputing the zoomed-in representation includes recomputing the zoomed-out representation and performing a backward substitution as a function of the recomputed zoomed-out representation to produce a recomputed zoomed-in representation.

7. A method according to claim 6, wherein performing a backward substitution includes generating zoomed-in line flows as a function of the recomputed zoomed-out representation.

8. A method of performing a contingency screening of an electrical power network, the method comprising:

receiving a previously computed, modular representation of the electrical power network, wherein the modular representation includes:
 a zoomed-in representation defined by a first plurality of variables and having internal line connections; and
 a zoomed-out representation defined by a second plurality of variables and having tie-line connections,
 wherein the first plurality of variables includes at least one variable not included in the second plurality of variables and at least one of the second plurality of variables is derived from a linear combination of line flows of two or more of the internal line connections;

receiving a line outage having an outage type, including receiving a line outage for which the outage type is a tie-line outage;

determining whether to recompute the zoomed-out representation or both of the zoomed-in and zoomed-out representations as a function of the outage type, including determining that the zoomed-out representation needs to be recomputed based on the tie-line outage;

recomputing, based on the line outage, the one(s) of the zoomed-in and zoomed-out representations determined at said determining step, including recomputing the zoomed-out representation as a function of the tie-line outage; and performing a backward substitution as a function of the recomputed zoomed-out representation and the tie-line outage to produce a recomputed zoomed-in representation.

9. A method according to claim 8, wherein performing a backward substitution includes generating zoomed-in line flows as a function of the recomputed zoomed-out representation.

10. A non-transitory machine-readable storage medium containing machine-executable instructions for performing a method of performing a contingency screening of an electrical power network, said machine-executable instructions comprising:

a first set of machine-executable instructions for receiving a previously computed, modular representation of the electrical power network, wherein the modular representation includes:

a zoomed-in representation defined by a first plurality of variables and having internal line connections; and a zoomed-out representation defined by a second plurality of variables and having tie-line connections, wherein the plurality of variables includes at least one variable not included in the second plurality of variables and at least one of the second plurality of variables is derived from a linear combination of line flows of two or more of the internal line connections;

a second set of machine-executable instructions for receiving a line outage having an outage type, including machine-executable instructions for receiving a line outage for which the outage type is an internal outage;

a third set of machine-executable instructions for determining whether to recompute the zoomed-out representation or both of the zoomed-in and zoomed-out representations as a function of the outage type, including machine-executable instructions for determining that both of the zoomed-in and zoomed-out representations need to be recomputed based on the internal outage; and a fourth set of machine-executable instructions for recomputing, based on the line outage, the ones(s) of the zoomed-in and zoomed-out representations determined by said third set of machine-executable instructions, including machine executable instructions for recomputing both of the zoomed-in and zoomed-out representations as a function of the internal outage;

wherein said fourth set of machine-executable instructions include machine-executable instructions for recomputing the zoomed-out representation and performing a backward substitution as a function of the recomputed zoomed-out representation to produce recomputed zoomed-in line flows.

11. A non-transitory machine-readable storage medium according to claim 10, wherein said machine-executable instructions for performing a forward transformation include machine-executable instructions for generating zoomed-in line flows as a function of the recomputed zoomed-out representation.

12. A non-transitory machine-readable storage medium containing machine-executable instructions for performing a method of performing a contingency screening of an electrical power network, said machine-executable instructions comprising:

a first set of machine-executable instructions for receiving a previously computed, modular representation of the electrical power network, wherein the modular representation includes:

a zoomed-in representation defined by a first plurality of variables and having internal line connections; and a zoomed-out representation defined by a second plurality of variables and having tie-line connections, wherein the first plurality of variables includes at least one variable not included in the second plurality of variables and at least one of the second plurality of variables is derived from a linear combination of line flows of two or more of the internal line connections;

a second set of machine-executable instructions for receiving a line outage having an outage type, including machine-executable instructions for receiving a line outage for which the outage type is a tie-line outage;

a third set of machine-executable instructions for determining whether to recompute the zoomed-out representation or both of the zoomed-in and zoomed-out representations as a function of the outage type, including machine-executable instructions for determining that the zoomed-out representation needs to be recomputed based on the tie-line outage;

a fourth set of machine-executable instructions for recomputing, based on the line outage, the one(s) of the zoomed-in and zoomed-out representations determined by said third set of machine-executable instructions, including machine-executable instructions for recomputing the zoomed-out representation as a function of the tie-line outage; and a fifth set of machine-executable instructions for performing a backward substitution as a function of the recomputed zoomed-out representation and the tie-line outage to produce a recomputed zoomed-in line flows.

13. A non-transitory machine-readable storage medium according to claim 12, wherein said fifth set of machine-executable instructions include machine-executable instructions for generating line flows as a function of the recomputed zoomed-out representation.

14. A non-transitory machine-readable storage medium according to claim 13, wherein said machine-executable instructions for generating line flows includes machine-executable instructions for multiplying connection matrices with recomputed line flows, starting with known line flows of the zoomed-out representation.

* * * * *